United States Patent
Madour

(10) Patent No.: US 7,388,855 B2
(45) Date of Patent: Jun. 17, 2008

(54) METHOD FOR DISCOVERING A BROADCAST MULTICAST SERVICES (BCMCS) CONTROLLER IN A PACKET DATA NETWORK

(75) Inventor: Lila Madour, Kirkland (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 494 days.

(21) Appl. No.: 10/986,821

(22) Filed: Nov. 15, 2004

(65) Prior Publication Data

US 2005/0117542 A1   Jun. 2, 2005

Related U.S. Application Data

(60) Provisional application No. 60/525,879, filed on Dec. 1, 2003.

(51) Int. Cl.
*H04Q 7/24* (2006.01)

(52) U.S. Cl. ............... 370/338; 370/231; 370/322; 370/329; 455/450; 455/451; 455/452.1; 455/452.2; 455/466; 709/217; 709/226; 709/212

(58) Field of Classification Search ............ 370/338, 370/231, 322, 329; 455/450, 451–453, 466; 709/217, 226, 312
See application file for complete search history.

(56) References Cited

U.S. PATENT DOCUMENTS

| | | | |
|---|---|---|---|
| 6,427,170 B1 * | 7/2002 | Sitaraman et al. | 709/226 |
| 6,735,631 B1 * | 5/2004 | Oehrke et al. | 709/226 |
| 6,944,706 B2 * | 9/2005 | Schain et al. | 710/312 |
| 7,127,496 B2 * | 10/2006 | Isozu et al. | 709/217 |
| 7,162,241 B2 * | 1/2007 | Kim et al. | 455/435.2 |
| 2003/0095520 A1 * | 5/2003 | Aalbers et al. | 370/338 |
| 2003/0097425 A1 * | 5/2003 | Chen | 709/220 |
| 2005/0075107 A1 * | 4/2005 | Wang et al. | 455/435.1 |
| 2005/0086340 A1 * | 4/2005 | Kang et al. | 709/224 |

* cited by examiner

*Primary Examiner*—Stephen M D'Agosta
(74) *Attorney, Agent, or Firm*—Alex Nicolaescu; Ericsson Canada Inc.

(57) ABSTRACT

A method and a packet data network for providing broadcast/multicast services (BCMCS) to a mobile terminal (MT). The method receives at a Dynamic Host Configuration Protocol (DHCP) server from the MT, for requesting an IP address of a primary BCMCS controller that serves the packet data network. The method retrieves the IP address of the primary BCMCS controller and responds to the MT with a response message from the DHCP server to the MT, the response message includes the IP address of the primary BCMCS controller. Next, the MT uses the IP address of the primary BCMCS controller and sends a Hyper Text Transfer Protocol (HTTP) request message from the MT to the primary BCMCS controller for requesting BCMCS services, the HTTP request message including a location information and an access type indicator of the MT. Afterwards, a list of available BCMCS programs is provided to the MT.

14 Claims, 3 Drawing Sheets

METHOD FOR DISCOVERING A BROADCAST MULTICAST SERVICES (BCMCS) CONTROLLER IN A PACKET DATA NETWORK

PRIORITY STATEMENT UNDER 35 U.S.C S. 119 (e) & 37 C.F.R. S.1.78

This non-provisional patent application claims priority based upon the prior U.S provisional patent applications entitled "Method for broadcast multicast controller discovery in a cdma2000 network", application No. 60/525,879, filed Dec. 1, 2003, in the name of Lila Madour.

BACKGROUND OF THE INVENTION

1. Field of the Invention

The invention relates to a method for providing packet data services to a user of a mobile terminal (MT).

2. Description of the Related Art

A user of a MT may subscribe to packet data services in a packet data network. In particular, the user may subscribe to receive broadcast/multicast service (BCMCS).

BCMCS services are intended to provide flexible and efficient mechanism to provide multimedia services to subscribers. One of the objectives for this service is to send the same information to multiple users. The transmitted information could be packet data such as text, voice and streaming media. As of today, a BCMCS controller delivers BCMCS services directly to the MT or via a packet data service node (PDSN). The PDSN is responsible for supporting authentication mechanisms and a configuration option to allow a terminal to receive Internet Protocol (IP) services such as VoIP (Voice over IP) and more generally voice/data multimedia over a wireless cellular network.

BCMCS subscription is associated with BCMCS programs provided by a BCMCS content provider (e.g. News Channel, Sports Channel), not the content (media type such as music, video, etc.). The subscriber selects a desired program and therefore selects the type of content he wishes to receive.

Furthermore, a transmission territory for each BCMCS program can be independently defined. BCMCS programs may be transmitted to all or selected zones of a packet data network. These zones constitute the transmission territory. The BCMCS programs may be received by all users or may be restricted to a group of subscribers via encryption.

The subscriber that wishes to receive BCMCS programs from a BCMCS capable network may discover the BCMCS controller that provides information of the available programs within the transmission territory where the subscriber is located. In particular, the subscriber may discover via its MT the BCMCS controller in the packet data network that provides the requested programs. Some solutions have tried to encompass the above problem.

A BCMCS controller may also be retrieved via mechanisms other then those provided by the BCMCS controller. These mechanisms may be via Wireless Access Protocol (WAP) or via Short Message Service (SMS) sent to the subscriber. Therefore, one of the existing solutions is to have only one BCMCS controller in the network and to provide an IP address that BCMCS controller to the MT via Internet.

Another solution allows only one BCMCS controller for a network and further populate during a PPP session establishment the IP address of the BCMCS controller. Alternatively, another solution could be to have multiple BCMCS controllers and further populate the corresponding IP addresses of these BCMCS controllers to the MTs located in the packet data network.

However, these solutions involve an amount of data that is not scalable in a packet data network and require that a Domain Name Server (DNS) application at the MT to be link layer agnostic for allowing a host such as the MT and a network to authenticate each other for network access to the MT. Consequently, this results in having a link breaks the IP layering rules for transmitting IP packets over specific link layer protocols. Therefore, there is a need to provide a solution for providing an IP address of a BCMCS controller to the MT in scalable way while maintaining the criteria of selecting a BCMCS controller for an MT without breaking the IP layer rules and in a way to be used for any access type.

SUMMARY OF THE INVENTION

It is therefore one broad aspect of this invention to provide a method for providing broadcast/multicast services (BCMCS) to a mobile terminal (MT) in a packet data network the method comprising steps of:

discovering the IP address of a primary BSMCS controller;

sending, based on the discovered IP address, a request message for requesting BCMCS services from the MT to the primary BCMCS controller, the request message including a location information and an access type indicator of the MT;

determining at the primary BSMCS controller whether the primary BCMCS controller serves a zone where the MT is located:

if the primary BCMCS controller serves the zone in which MT is requesting BCMCS services, providing a list of available BCMCS programs to the MT;

if the primary BCMCS controller serves a zone different from the zone where the MT is requesting BCMCS services:

retrieving, from a list of IP addresses of secondary BCMCS controllers stored in a database of the primary BCMCS and based on the received location information and the access type indicator, a secondary BCMCS controller that serves the zone where the MT is located and that can provide BCMCS services to the MT; and forwarding the request message for BCMCS services from the primary BCMCS controller to the secondary BCMCS controller.

It is therefore another broad aspect of his invention to provide packet data network for providing broadcast/multicast services (BCMCS) to a mobile terminal (MT), the packet data network comprises:

a primary BCMCS controller for providing BCMCS services to the MT, the primary BCMCS controller comprising:

a service logic for receiving request message from the MT for requesting BCMCS services, the request message including a location information and an access tvoe Indicator of the MT;

a database for storing a list of IP addresses of secondary BCMCS controllers;

wherein the service logic determines whether the primary BCMCS controller serves a zone where the MT is located:

if the primary BCMCS controller serves the zone in which MT is requesting BCMCS services provides, the service logic provides to the MT a list of available BCMCS programs;

if the primary BCMCS controller serves a zone different from the zone where the MT Is requesting BCMCS services, the service logic retrieves, based on the received location information and the access type indicator of the MT, a secondary BCMCS controller that serves the zone where the MT is located and that can provide BCMCS services to the MT and forwards from to the secondary BCMCS controller the request message.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
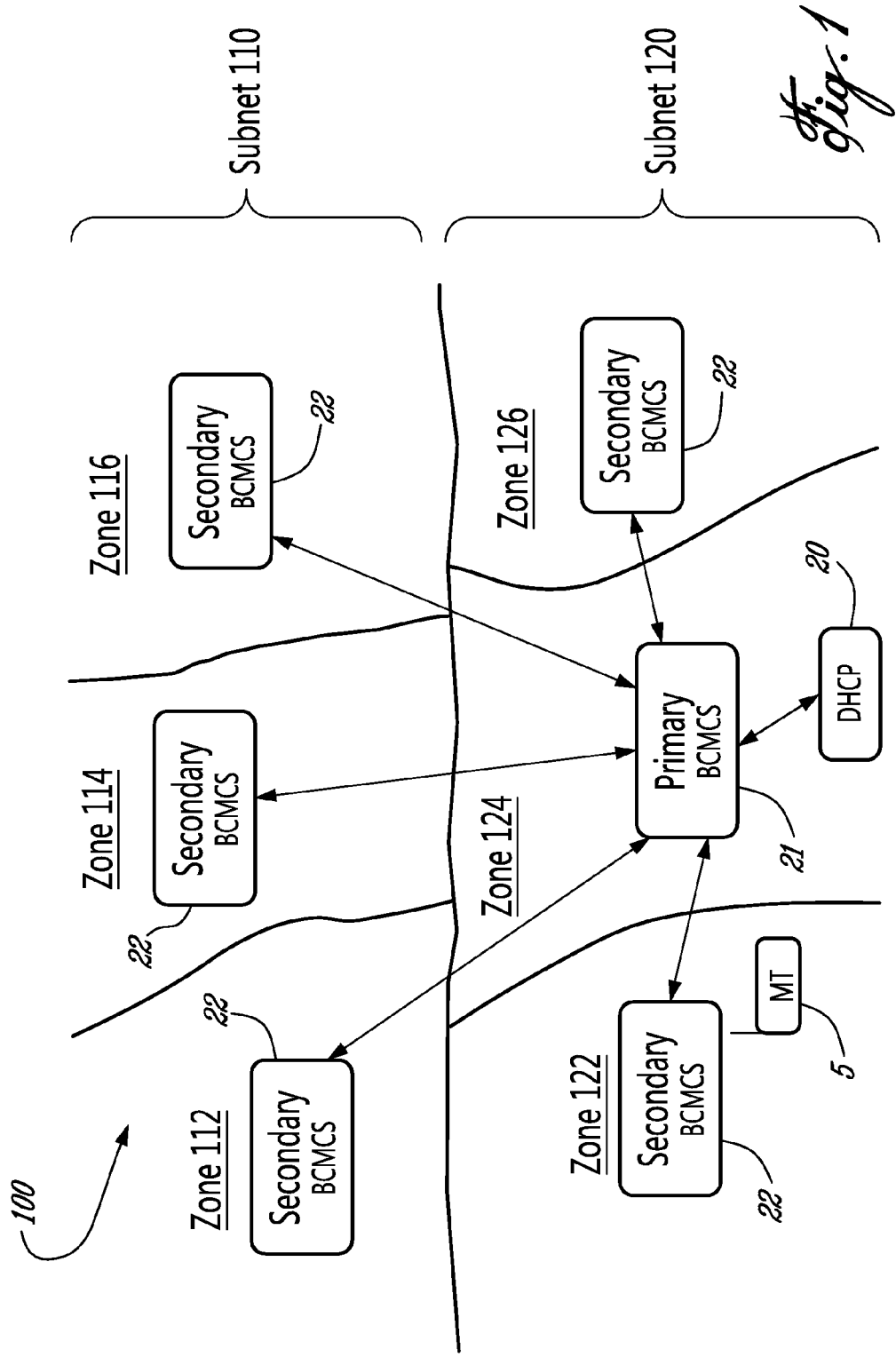
FIG. 1 is illustrating a packet data network in which a mobile terminal (MT) requests broadcast/multicast services (BCMCS) in accordance to the invention.

Reference is now made to FIG. 1, which illustrates a packet data network 100 in which a mobile terminal (MT) 5 requests broadcast/multicast services (BCMCS) in accordance to the invention. BCMCS services allow the MT 5 to receive BCMCS programs provided by BCMCS content providers such as television broadcasting companies (e.g. News Channel, Sports Channel). The packet data network 100 comprises subnets 110 and 120. A subnet is a region that comprises zones in which the MT 5 may roam and receives packet data services. A Dynamic Host Configuration Protocol (DHCP) server 20 is available in the packet data network 100 and serves all the MTs located in the packet data network 100. The DHCP server 20 allocates and delivers configuration parameters such as Dynamic Networking Server (DNS) IP address to MTs located in the packet data network 100. Both subnets 110 and 120 comprised zones in which users of the MTs can receive broadcast/multicast services (BCMCS). In FIG. 1, the subnet 110 comprises zones 112, 114 and 116 while subnet 120 comprises zones 122, 124 and 126. As shown in FIG. 1, a secondary BCMCS controller 22 is assigned to one or more zones. However, instead of being physically located in a zone, each secondary BCMCS controller 22 may be collocated to a primary BCMCS controller 21.

Figure 2:
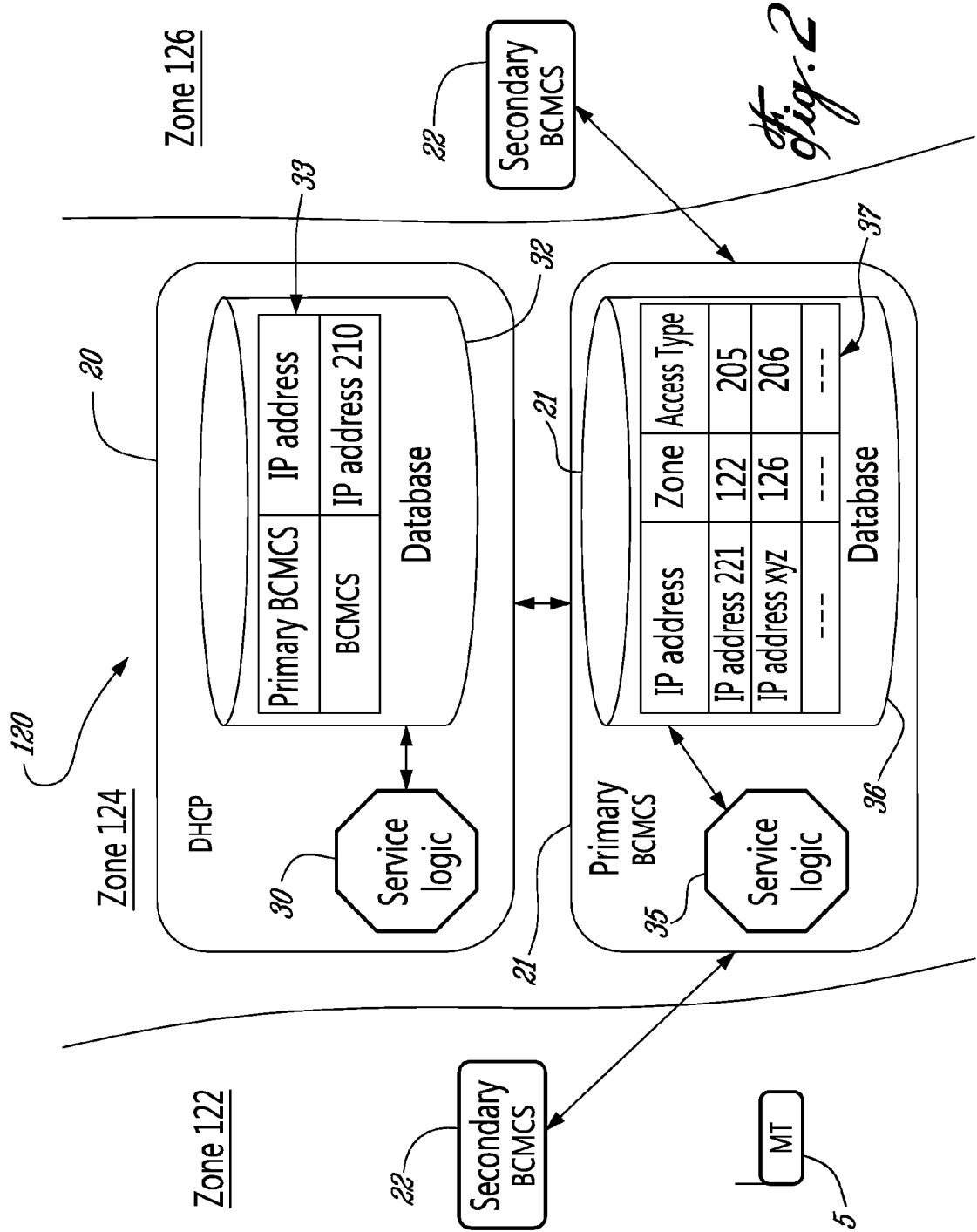
FIG. 2 is illustrating a subnet of a packet data network in which a mobile terminal (MT) requests broadcast/multicast services (BCMCS) in accordance to the invention.

Reference is now made to FIG. 2, which illustrates the subnet 120 of the packet data network 100 in which the MT 5 requests BCMCS services in accordance to the invention. The DHCP 20 comprises a service logic 30 for receiving, processing and sending messages in the packet data network 100. The service logic 30 also accesses a database 32, which stores in a list 33 an IP address 210 of the primary BCMCS controller 21 that serves the packet data network 100. A network operator provides and updates the IP address 210 of the primary BCMCS controller 21 in the database 32. The primary BCMCS controller 21 comprises a service logic 35 for receiving, processing and sending messages in the packet data network 100. The service logic 35 also accesses a database 36, which stores a list 37 of IP addresses of secondary BCMCS controllers 22. The primary BCMCS 21 also provides BCMCS services to MTs. Therefore, a zone is served by either the primary BCMCS controller 21 or one of the secondary BCMCS controllers 22.

Figure 3:
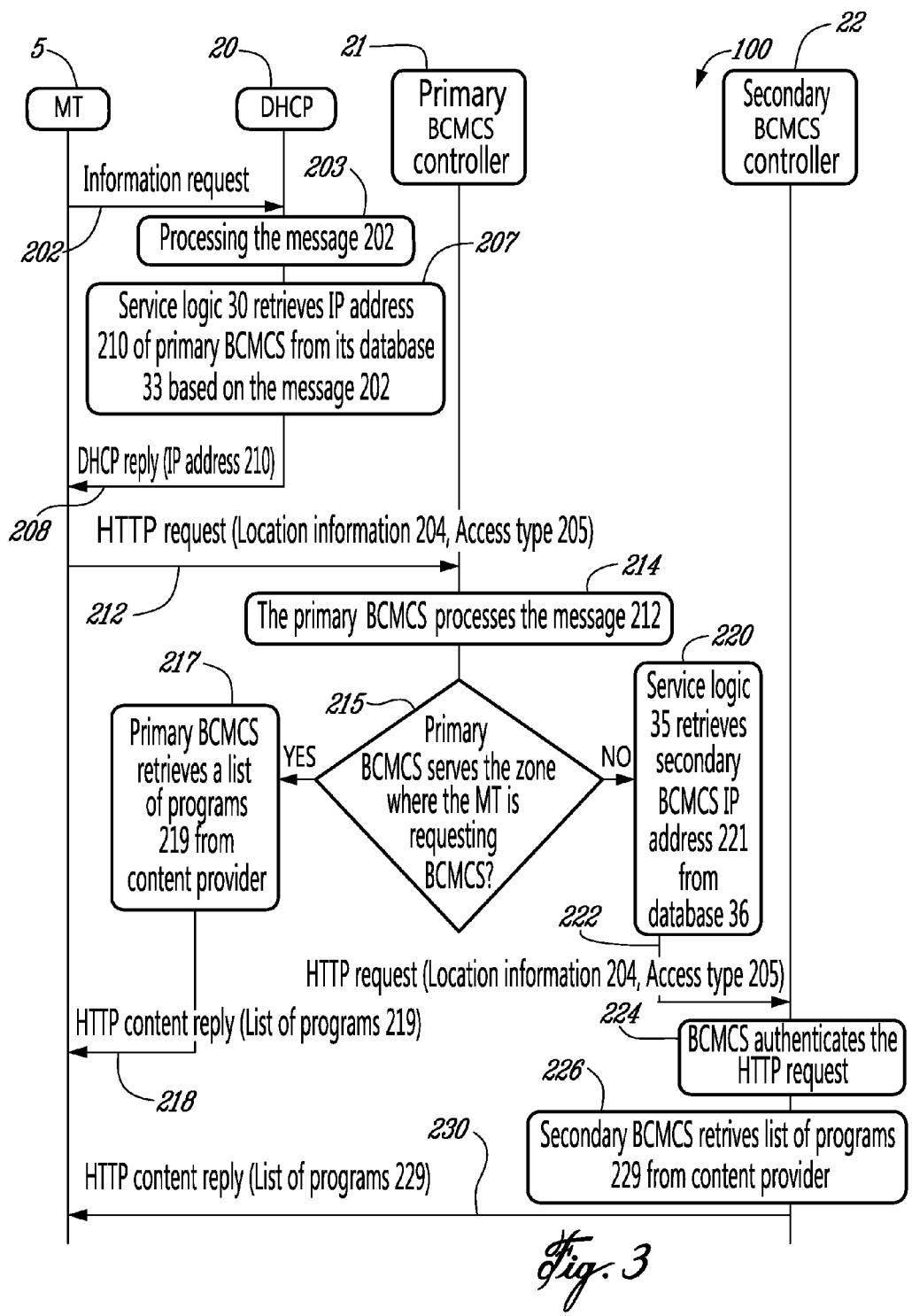
FIG. 3 is a nodal operation and signal flow diagram illustrating a flow of messages of a method for providing broadcast/multicast services (BCMCS) to a mobile terminal (MT) in a packet data network in accordance to the invention.

Reference is now made to FIG. 3, which is a nodal operation and signal flow diagram illustrating a flow of messages of a method for providing BCMCS services and more particularly the IP address 210 of the primary BCMCS controller to the MT 5 in the packet data network 100 in accordance to the invention. Anytime the MT 5 wishes to receive BCMCS services it has to discover a serving primary BCMCS controller, which is serving the packet data network 100. The MT 5 determines that it needs the primary BCMCS controller 21 IP address and sends a DHCP Information request message 202 (DHCPINFORM (IPv4) or Information-request message (IPv6) using the DHCP relay multicast IP address) to the DHCP server 20 for requesting the IP address 210 of the primary BCMCS controller 21.

The DHCP server 20 receives and processes the Information request message 202 (step 203). At step 207, the service logic 30 retrieves the IP address 210 from database 32 and the DHCP 20 responds to the request message 202 with a DHCP reply 208, which includes the IP address 210 of the primary BCMCS controller 21.

Upon reception of the DHCP reply 208, the MT 5 uses the received IP address 210 and sends a Hyper Text Transfer Protocol (HTTP) request 212 to the primary BCMCS controller 21 for requesting BCMCS services and more particularly a list of available BCMCS programs. The HTTP request 212 includes a location information 204 and an access type indicator 205. The location information 204 may be a packet zone identification (PZID) parameter within a particular System ID/Network ID (SID/NID) area of a CDMA2000 network (not shown) from which the MT 5 is accessing the packet data network 100. Therefore, a combined PZID/SID/NID consists of an access network ID (ANID) and is unique for each MT. The location information 204 may also be a subnet identifier (subnet ID), a user zone or a cell ID if the MT 5 is accessing the packet data network 100 via a cellular telecommunication network (not shown). The access type indicator 205 identifies the type of network in which the MT 5 is registered and which type of network the MT 5 is accessing the packet data network 100. For example, the type of access may be a Code Division Multiple Acess2000 network access, a Wireless Local area network (WLAN) access or a Digital Subscriber Line (DSL) access.

At step 214, the primary BCMCS controller 21 processes the HTTP request 212 and the service logic 35 determines whether or not the primary BCMCS controller 21 serves a zone in which the MT 5 is located and requesting BCMCS services (step 215). If the primary BCMCS controller 21 serves a zone in which MT 5 is requesting BCMCS services, the primary BCMCS controller 21 retrieves from a BCMCS content provider (not shown) (step 217) a list of available BCMCS programs 219 and provides the requested list of programs 219 to the MT 5 in an HTTP content reply 218. Following this, The MT 5 may select a BCMCS program from the provided list 229.

However, if the primary BCMCS controller 21 does not serve the particular zone, the primary BCMCS controller 21, via its service logic 35 and based on the received location information 204 and the access type indicator 205, retrieves an IP address 221 from the list 37 of IP addresses of secondary BCMCS controllers stored in database 36, a secondary BCMCS controller 22 that serves the zone in which the MT 5 requests BCMCS services and that can provide BCMCS services to the MT 5 (step 220). In FIGS. 1 and 2, the MT 5 is located in zone 122. The primary BCMCS controller 21 then uses the retrieved IP address 221 of the secondary BCMCS controller 22 and forwards the HTTP request 212 in an HTTP request 222 to the secondary BCMCS controller 22. At step 224, the secondary BCMCS controller 22 authenticates the HTTP request 222 and retrieves from a BCMCS content provider (not shown) (step 226) a list of available BCMCS programs 229 and provides the requested list of programs 229 to the MT 5 in an HTTP content reply 230.

It can be understood that some messages and therefore some parameters sent from the MT 5 to the packet data network 100 and vice versa are not mentioned nor described for clarity reasons. Also some messages and therefore some parameters sent between network elements in the packet data network 100 are omitted for clarity reasons. It should also be understood that FIGS. 1-3 each depicts a simplified packet data network 100, and that many other nodes have been omitted for clarity reasons only.

What is claimed is:

1. A method for providing broadcast/multicast services (BCMCS) to a mobile terminal (MT) in a packet data network the method comprising steps of:
   receiving at a Dynamic Host Configuration Protocol (DHCP) server from the MT, a request message for requesting an IP address of a primary BCMCS controller that serves the packet data network;
   retrieving at the DHCP server the IP address of the primary BCMCS controller;
   sending a response message from the DHCP server to the MT, the response message including the IP address of the primary BCMCS controller;
   sending, based on the IP address of the primary BCMCS controller, a request message for requesting BCMCS services from the MT to the primary BCMCS controller, the request message including a location information and an access type indicator of the MT;
   determining at the primary BSMCS controller whether the primary BCMCS controller serves a zone where the MT is located:
   if the primary BCMCS controller serves the zone in which MT is requesting BCMCS services, providing a list of available BCMCS programs to the MT;
   if the primary BCMCS controller serves a zone different from the zone where the MT is requesting BCMCS services:
      retrieving, from a list of IP addresses of secondary BCMCS controllers stored in a database of the primary BCMCS and based on the received location information and the access type indicator, a secondary BCMCS controller that serves the zone where the MT is located and that can provide BCMCS services to the MT; and
      forwarding the request message for BCMCS services from the primary BCMCS controller to the secondary BCMCS controller.

2. The method of claim 1, wherein the step of forwarding further comprises the steps of:
   retrieving a list of available BCMCS program from a BCMCS content provider; and
   providing the list of programs to the MT in a reply message responsive to the reception of the forwarded request message for BCMCS services.

3. The method of claim 1, wherein the secondary BCMCS is collocated to the primary BCMCS.

4. The method of claim 1, wherein the request message sent from the MT to the BCMCS is a Hyper Text Transfer Protocol (HTTP) request message.

5. The method of claim 1, wherein the reply message sent from the primary BCMCS to the MT is a HTTP reply message.

6. The method of claim 1, wherein the packet data network is one of a Code Division Multiple Access 2000 (CDMA2000) network, a Wireless Local Area Network (WLAN) or a Digital Subscriber Line (DSL) network.

7. The method of claim 2, wherein the reply message sent from the secondary BCMCS to the MT is a HTTP reply message.

8. A packet data network for providing broadcast/multicast services (BCMCS) to a mobile terminal (MT), the packet data network comprising:
   a primary BCMCS controller for providing BCMCS services to the MT, the primary BCMCS controller comprising:
      a service logic for receiving request message from the MT for requesting BCMCS services, the request message including a location information and an access type indicator of the MT;
      a database for storing a list of IP addresses of secondary BCMCS controllers;
   a Dynamic Host Configuration Protocol (DHCP) server comprising a service logic for receiving from the MT an information request message, the information request message being sent for requesting an IP address of the primary BCMCS controller, and sending a DHCP response message to the MT, the DHCP response message including the IP address of the primary BCMCS controller;
   wherein the service logic of the primary BCMCS determines whether the primary BCMCS controller serves a zone where the MT is located:
      if the primary BCMCS controller serves the zone in which MT is requesting BCMCS services provides, the service logic provides to the MT a list of available BCMCS programs; and
      if the primary BCMCS controller serves a zone different from the zone where the MT is requesting BCMCS services, the service logic of the primary BCMCS retrieves, based on the received location information and the access type indicator of the MT, a secondary BCMCS controller that serves the zone where the MT is located and that can provide BCMCS services to the MT and forwards from to the secondary BCMCS controller the request message.

9. The packet data network of claim 8, wherein the secondary BCMCS controller retrieves a list of available BCMCS programs from a BCMCS content provider and provides the list of programs to the MT in reply message responsive to the reception of the forwarded request message for receiving BCMCS services.

10. The packet data network of claim 8, wherein the DHCP server further comprises a database for storing the IP address of primary BCMCS controllers.

11. The packet data network of claim 8, wherein the request message sent from the MT to the BCMCS is a Hyper Text Transfer Protocol (HTTP) request message.

12. The packet data network of claim 8, wherein the reply message sent from the primary BCMCS to the MT is a HTTP reply message.

13. The packet data network of claim 8, wherein the packet data network is one of a Code Division Multiple Access 2000 (CDMA2000) network, a Wireless Local Area Network (WLAN) or a Digital Subscriber Line (DSL) network.

14. The packet data network of claim 9, wherein the reply message sent from the secondary BCMCS to the MT is a HTTP reply message.

* * * * *